US006693587B1

(12) United States Patent
Kuether et al.

(10) Patent No.: US 6,693,587 B1
(45) Date of Patent: Feb. 17, 2004

(54) ANTENNA/FEED ALIGNMENT SYSTEM FOR RECEPTION OF MULTIBEAM DBS SIGNALS

(75) Inventors: David J. Kuether, Brea, CA (US); Kesse Ho, Westminster, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 10/339,949

(22) Filed: Jan. 10, 2003

(51) Int. Cl.[7] ............................ H01Q 3/00; H04N 7/20
(52) U.S. Cl. ......................................... 342/359; 725/72
(58) Field of Search ................................ 342/359, 354, 342/356; 725/72; 455/3.02; 343/781 R, 779

(56) References Cited

U.S. PATENT DOCUMENTS 5,579,367 A 11/1996 Raymond et al.
5,983,071 A 11/1999 Gagnon et al.
6,029,044 A 2/2000 Arsenault et al.
6,216,266 B1 4/2001 Eastman et al.
6,344,832 B1 * 2/2002 Lotfy ........................ 343/779
6,441,797 B1 * 8/2002 Shah ......................... 455/3.04
6,600,730 B1 * 7/2003 Davis et al. ............... 455/3.02
2003/0163822 * 8/2003 Knutson et al. ............. 725/72

* cited by examiner

*Primary Examiner*—Thomas H. Tarcza
*Assistant Examiner*—F H Mull
(74) *Attorney, Agent, or Firm*—John A. Crook; Michael W. Sales

(57) ABSTRACT

A system and method for positioning a dish antenna having a plurality of low noise block converters for the simultaneous reception of signals from a plurality of satellites in a direct broadcast satellite system. An integrated receiver/decoder alternately powers at least two low noise block converters to sample signals for comparison to a dynamic threshold value to detect a peak signal for each of the low noise block converters. When the peak signals are detected, they are compared to a dynamic master threshold to indicate a master lock for the system.

18 Claims, 3 Drawing Sheets

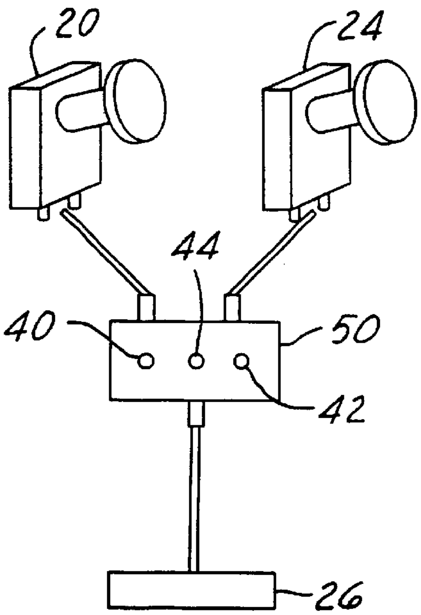
FIG. 3
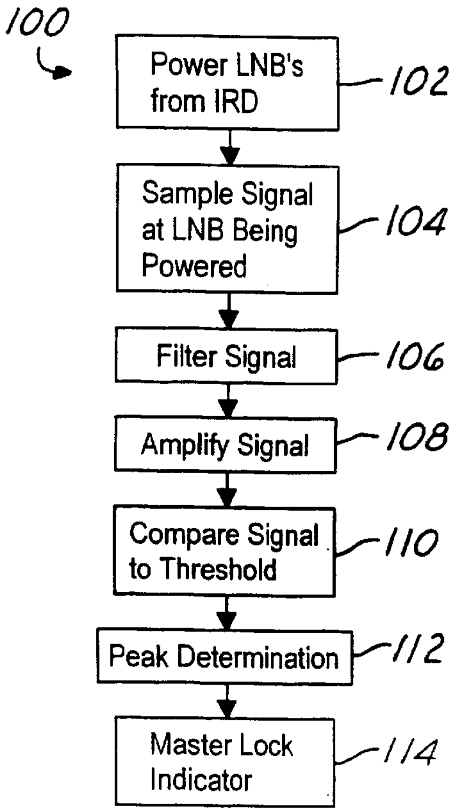
FIG. 6
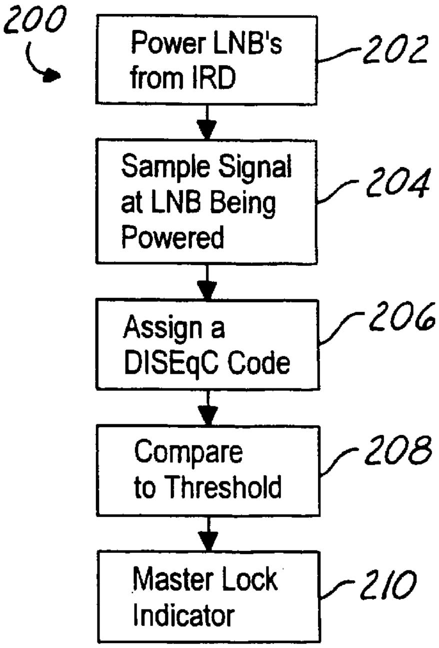
FIG. 7
| DISEqC Translation Table | |
|---|---|
| Code# | Condition |
| 248 | Alignment System Off |
| 249 | 101W Signal Low |
| 250 | 101W Signal Medium |
| 251 | 101W Signal Level High |
| 252 | 119W Signal Low |
| 253 | 119W Signal Medium |
| 254 | 119W Signal Level High |
| 255 | Master Signal Lock |
FIG. 8

ANTENNA/FEED ALIGNMENT SYSTEM FOR RECEPTION OF MULTIBEAM DBS SIGNALS

RELATED APPLICATIONS

The present invention is cross-referenced to application Ser. No. 10/339,918 filed concurrently herewith and which is incorporated by reference herein.

TECHNICAL FIELD

The present invention relates generally to satellite communication equipment and more particularly to an antenna alignment installation aid and diagnostic tool for a satellite user.

BACKGROUND OF THE INVENTION

Dish antennas and receivers for audio/video transmission signals allow home viewers to receive television programming directly from satellite transmissions. The satellite dish antenna is typically secured to a mounting and must be aligned. Alignment involves physically boresighting the dish antenna so that its sensitive axis is directed at the broadcasting satellite.

The antenna dish is typically installed on the roof of a home, while the television is inside the home. In this arrangement, the antenna boresighting operation either requires two people to complete, or it requires an installer to travel back and forth between the antenna and the television several times, while trying to adjust the antenna for maximum signal reception.

For maximum signal reception, reasonably precise pointing of the antenna to the broadcast satellite is required. This task is not possible with visual boresighting. In the prior art, this task is accomplished by measuring the signal strength from the satellite as an indication of the precision pointing to the installer. It is also known to provide a visual indicator of the signal strength at the low noise block converter (LNB) of the satellite antenna. A light emitting diode presents a flashing rate to the installer that corresponds to the signal strength at the LNB. This method may not require the installer to go back and forth between television and the dish antenna, but is simply not capable of precise measurements.

Signal strength is not an accurate indication of the signal quality. However, it is typically not possible to measure signal quality parameters at the LNB without significant modifications to the LNB. In order to optimize the signal quality at the receiver, the quality of the signal must be used as an indicator and not merely the strength of a signal. It is possible to have a very strong signal that is poor quality. Prior art devices tend to correlate a strong signal with a quality signal and this is not always the case.

Another level is added to the complexity of the installation method when more than one satellite is involved in the system. For multiple satellites, the antenna position must be such that reception from all of the satellites is maximized. The simultaneous reception of signals from two or more satellites requires additional LNB's on the antenna feed assembly. A balanced alignment among all the LNB's is necessary. The installer must be skilled enough, or lucky enough, to adjust tilt, elevation and azimuth alignments for all of the LNB's and minimize the number of trips back and forth between the antenna on the roof and the receiver in the house.

There is a need for a method and system that allows precision antenna orientation adjustments that can be made by a single user without making several trips between the satellite dish outside of a dwelling and the television inside the dwelling.

SUMMARY OF THE INVENTION

The present invention is a system and method for adjusting an antenna to maximize the quality of a program signal for at least two satellite locations. The present invention has a setup mode in an integrated receiver/decoder (IRD) where the IRD toggles between a first tone that correlates with a first LNB and a second tone that correlates with a second LNB. The toggling persists even after the IRD has acquired a signal lock on one of the LNB's, allowing a signal lock to be acquired on the second LNB.

According to the present invention a simple circuit in the LNB monitors the signal output strength and produces an indicator when a peak has occurred. A summing circuit is used to indicate a master-lock for both LNB's in which the peak detection of both signals is added. The IRD is used as a power source during the setup mode, thereby eliminating the need for and external battery pack while aligning the antenna.

An alternate embodiment of the present invention works in conjunction with signal feedback such as Pulse Width Modulation (PWM), tone detection and standard DiSEqC codes. DiSEqC is a European code developed to communicate between the antenna and the receiver to switch an LNB to a different satellite. The present invention uses signal feedback such as existing DiSEqC codes to determine the quality of the signal to the receiver. A quality signal has a low signal-to-noise ratio, while a strong signal has high amplitude. Therefore, the present invention is capable of measuring signal quality for antenna positioning instead of merely relying on signal strength.

It is an object of the present invention to precisely orient an antenna with at least two satellite locations. It is another object of the present invention to provide an indication of peak alignment using signal quality. It is still another object of the present invention to utilize existing DiSEqC codes as an indication of signal quality in the method and system of aligning an antenna with more than one satellite.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings:

FIG. 3 is a block diagram of an LNB/multi-switch embodiment of the present invention;

FIG. 6 is a flow chart of the analog method of the present invention;

FIG. 7 is a flow chart of the digital method of the present invention;

FIG. 8 is a chart of sample DiSEqC codes assigned to sample values taken from the LNB's.

DETAILED DESCRIPTION OF PREFERRED EMBODIMENTS

Figure 1:
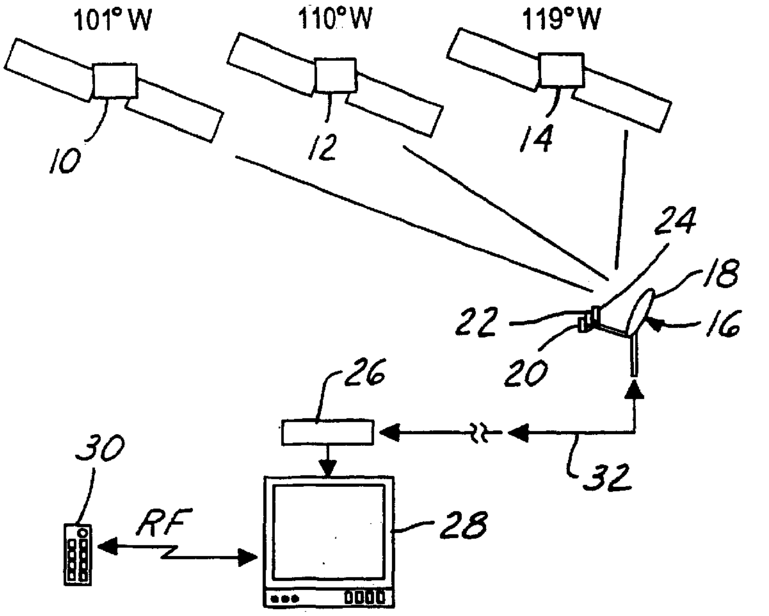
FIG. 1 is a diagram representing a system view of key elements of the present invention.

FIG. 1 provides a system view of key elements of the present invention. Multiple satellites 10, 12, 14 broadcast transmissions having digital and/or analog program information to a satellite antenna 16. Presently there are three Direct Broadcast Satellite (DBS) locations assigned to the United States DBS industry, from which the satellites can cover the entire CONUS; 101° W, 110° W and 119°W.

The antenna 16 has a reflector 18 which collects the energy transmitted from the satellites 10, 12, 14 and focuses the energy on a plurality of LNB's 20, 22, 24. The LNB's 20, 22, 24 typically generate signals from the received energy, which is provided to an integrated receiver/decoder (IRD) 26, such as a set top box, by way of a coaxial cable or similar device.

The IRD 26 receives, decodes and demodulates the signal from the LNB's 20, 22, 24 and provides a video signal to an output device, such as a television 28. The IRD 26 is controlled by a remote control 30. The remote control 30 has a user input interface, typically an array of buttons, for accepting user commands. The user commands are used to generate coded signals, which are transmitted to the IRD 26.

The present invention provides an installer, and/or user, with an indication of the signal quality of the signal being received at the IRD for adjusting the antenna. Alignment of antenna 16 requires the determination of azimuth and elevation. However, to properly adjust the multi-beam antenna feed assembly for the reception of any two, or all three, slots, a tilt adjustment is also necessary. The angle of the tilt varies depending on the location in the CONUS where the antenna 16 is located.

The present invention is described herein using at least two LNB's that are associated with the extremes of the satellite locations. For example, a first LNB 20 corresponds to 101° W and a second LNB 24 corresponds to 119° W. It follows that the other locations fall between the two extremes and are therefore not necessary for optimum alignment. One of ordinary skill in the art is capable of transposing the present invention such that it can be applied to more than two LNB's without departing from the scope of the present invention.

In a setup mode each LNB 20, 24 is powered, one at a time, by the IRD 26. The power is toggled to the LNB's 20, 24. The LNB's are not powered simultaneously so as to keep the size and cost of the IRD 26 to a minimum. A digital signal 32 from the IRD 26 is fed back to the LNB and is representative of either a signal strength or a signal quality.

According to one embodiment of the present invention, the signal is assigned a code, such as an existing DiSEqC code, that represents the signal-to-noise ratio and not the signal amplitude. It is emphasized here that a new signal is not generated to indicate signal amplitude. According to the present invention, an existing code is assigned to the signal quality measurement, and the code is used to notify the LNB 20, 24 that a peak signal has been detected.

Figure 2:
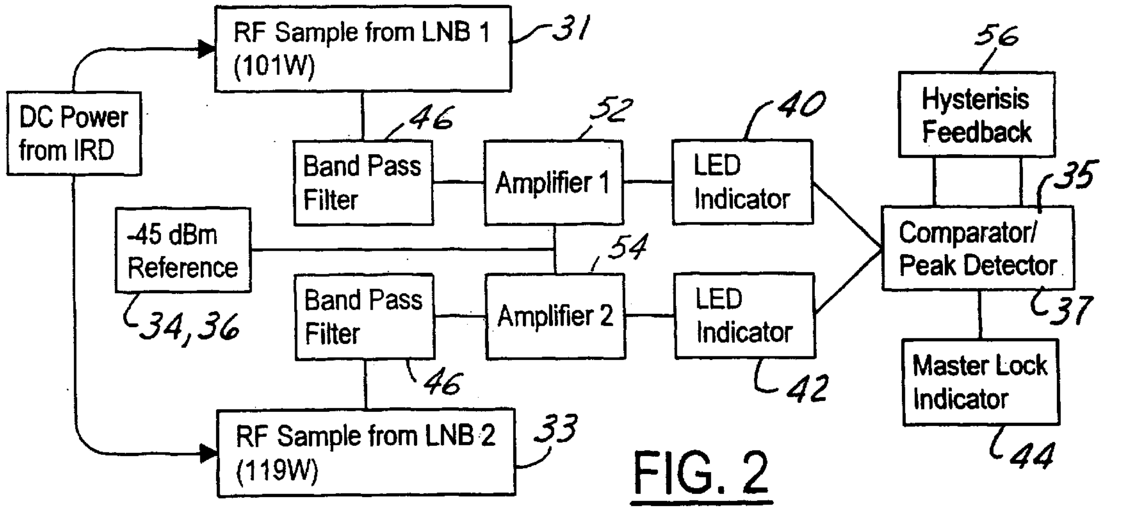
FIG. 2 is a flow chart of the method of the present invention.

Referring now to FIG. 2 there is shown a block diagram of the present invention. Each LNB has a peak detector to detect, process and divine the signal 32. An RF sample signal, 31 and 33, is taken from each LNB. A simple microprocessor is capable of the measurement, storage, and calculations of the present invention. The signal 31, 33 is compared to a first reference signal 34, 36 for the respective LNB. A comparator 35 determines if the sample signal 31 meets a first predetermined threshold value 34 and a peak detector 37 detects the peak so that a peak indicator 40 can provide an indication that a peak signal has been detected for that particular LNB 20. The other LNB 24 sends a second sample signal 33 that is compared 35 to a second predetermined threshold value 36 until a peak is detected 37 and an indication 42 that a peak signal has been detected for the second LNB 24 is provided. The LNB signals are compared to each other in the comparator 35 and to a maximum peak value to provide a master-lock indicator 44 to the installer.

A band pass filter 46, 48 is used for each sample signal 31, 33 to isolate the portion of the signal that is of interest in the comparison. Further, the filtered signals 31, 33 are amplified by amplifiers 52, 54 to enhance the comparison to the threshold signals 34, 36.

The present invention can be either analog or digital. In the analog version it may be desirable to apply hysteresis feedback 56 to the comparison of the analog sample signals 31, 33 to the threshold values 34, 36. In the event the signals are near to each other in value, the hysteresis 56 will prevent the indicator from toggling.

The present invention could take the form of a handheld device 50, as shown in FIG. 3. This device 50 is temporarily inserted in line with the LNB's 20, 24 and the receiver 26 in order to perform the installation and then is removed. The handheld device includes indicators 40, 42 and 44 for providing peak detection indication to the user. The indicators may be visual, such as an LED, or audible, such as a tone indicator.

Figure 4:
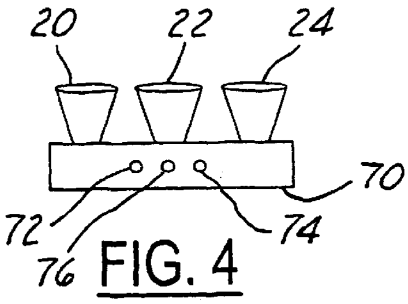
FIG. 4 is an embodiment of the present invention having integrated LED's in a multiple feed LNB.
Figure 5:
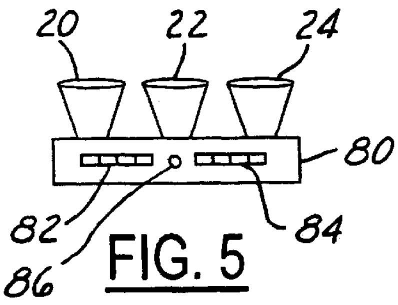
FIG. 5 is an embodiment of the present invention having an LED and bar graphs in a triple feed LNB

In other embodiments, the device takes other forms and the peak indicators are audible and/or visual indicators as well. For example, FIG. 4 shows a triple feed LNB 70 has integrated LED's 72, 74, and 76 representing first peak, second peak and master lock indicators respectively. As another example, in FIG. 5 there is shown a triple feed LNB 80 wherein first and second peak indicators 82 and 84 are bar graphs, or a plurality of LED's, that light up according to signal quality, and a master lock indicator 86. It should be noted that these embodiments are described for example purposes and that one of ordinary skill in the art is capable of making structural changes without departing from the scope of the present invention.

FIG. 6 shows a flow chart of the method 100 of the present invention in analog form. The IRD is used as the power source in this open loop configuration. The LNB's are powered 102 from the IRD in an alternating fashion. A sample signal is taken 104 from each LNB when it is powered. The sampled signal is filtered 106 to isolate the portion of the signal that is of interest. The signal is amplified 108, and compared 110 to a threshold value to make a peak determination 112 for each LNB. The LNB peaks are compared to make a determination of a master lock. Upon determining a peak for each LNB, a master lock indicator is provided 114. In the analog version, and referring again to FIG. 2, hysteresis feedback 56 is taken into account when the signal is near threshold to make the indicator more stable.

FIG. 7 shows a flow chart of the method 200 of the present invention in a digital form. In this closed loop configuration, the codes are used to indicate signal quality in the peak determination for a master lock. Similar to the analog version, the LNB's are powered 202 by the IRD consecutively. The LNB sends signal information 204 back to the IRD. The IRD assigns 206 a code, such as a DiSEqC code, PWM code, or tone, based on the signal information at the LNB. The code is compared 208 to a threshold for each LNB, and then the thresholds are compared to each other for a master lock 210.

It should be noted that in the digital version it may also be desirable to filter 106 and amplify 108 the signal as described with reference to the analog version and in conjunction with FIG. 6.

There are several advantages to the digital method. The DiSEqC codes are already in the IRD and therefore the method does not require the generation of new signals for signal strength measurements and peak indications. Further, digital processes are less sensitive than analog devices and therefore much less complex. For example, there is no need to take hysteresis into account in this digital method.

FIG. 8 is a table of DiSEqC codes that could be used in assigning codes to the sample signals taken at the LNB's. The DiSEqC code assigned can be translated into the applicable condition. For example, code 248 indicates the alignment system is "OFF". Code 255 would indicate a master signal lock.

Figure 9:
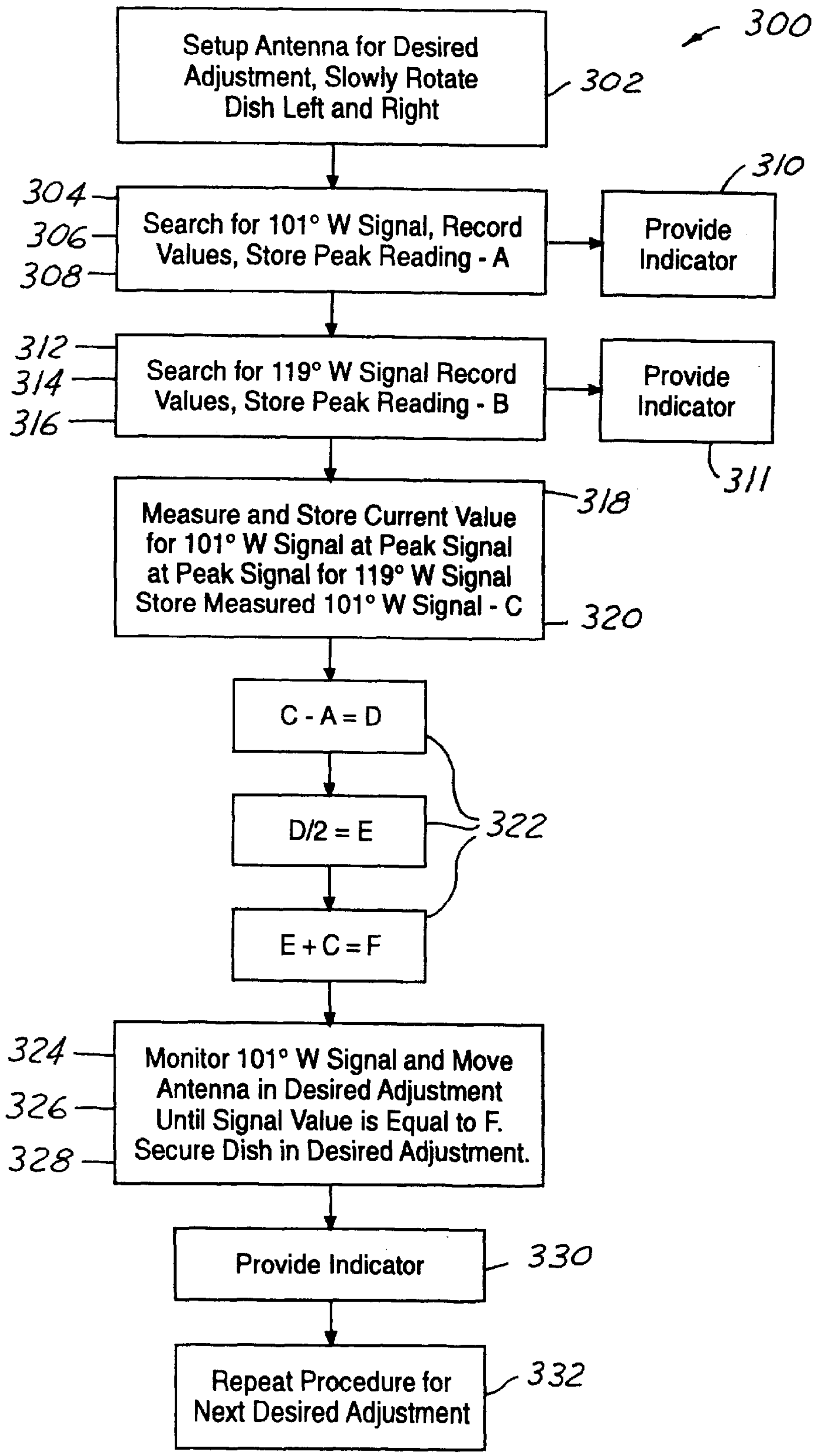
FIG. 9 is a flow chart of a dynamic threshold method of the present invention.

FIG. 9 is a flowchart for a dynamic threshold value used to detect peak signals in the present invention. The dynamic threshold value is advantageous because it reduces the time needed to setup and align a multi-satellite dish antenna. The antenna is put in setup mode 302 for a first boresight angle, either azimuth or elevation, and slowly rotated left and right.

The antenna searches 304 for the 101° W signal, records values 306, and stores 308 a peak reading A. Once a peak value has been stored, it is possible to indicate 310 to the user or operator that the peak signal has been found. In one embodiment, a blinking LED may be used to indicate the antenna is searching and a constantly lit LED may be used to indicate the peak has been found and stored. It is possible that one skilled in the art could use a different method to achieve the same result, which is to provide an indication that the signal is being searched and then provide an indication that the signal has been found.

Once the peak 101° W value has been found, the search 312 begins for the 119° W signal. The dish is rotated, values are stored 314, and a peak reading B is stored 314. Again, it is desirable to provide an indication 316 to the user that the signal is being searched for and then another indication should be provided when the peak signal has been found. When the peak signal B for the 119° W signal has been found, a measurement 318 is made of the current signal value for the 101° W signal, that is saved 320 as C.

The dynamic threshold is calculated 322 as follows:

$$A-C=D \quad (1)$$

$$D/2=E \quad (2)$$

$$E+C=F \quad (3)$$

While monitoring 324 the 101° W signal, the dish antenna is moved 326 in the desired boresight until the signal is equal to the value calculated as F. The dish is secured 328 in the first boresight position. Once the value F has been detected, an indication 330, i.e. an LED, should be provided to notify the user that the first alignment has been accomplished. The entire alignment procedure is then repeated 332 for the remaining boresight angle. For example, if azimuth adjustments were completed, the procedure is completed for elevation adjustments in the same manner as for the azimuth.

The invention covers all alternatives, modifications, and equivalents, as may be included within the spirit and scope of the appended claims.

What is claimed is:

1. A system for positioning a dish antenna having a plurality of low noise block converters (LNB's) for the simultaneous reception of signals from a plurality of satellites in a direct broadcast satellite system comprising:

an integrated receiver/decoder (IRD) for powering a first LNB corresponding to a first satellite and a second LNB corresponding to a second satellite, where said first and second LNB's and said first and second satellites correspond to the extreme limits of the satellites in the plurality of satellites, the IRD toggling the power to the first and second LNB's;

a first peak detector for comparing sample signals from the first LNB to determine a first threshold value;

a first peak indicator being activated upon the first sample signal meeting the first threshold value;

a second peak detector for comparing sample signals from the second LNB to a determine a second threshold value;

a second peak indicator being activated upon the second sample signal meeting the second threshold value;

means for measuring an instantaneous signal value for the first LNB upon determination of the second threshold value;

means for calculating a dynamic peak threshold value from the first and second threshold values;

means for monitoring the current signal value for the first LNB, whereby the antenna is moved until the current signal value for the first LNB is equal to the dynamic peak threshold value; and a master lock indicator for indicating a master lock when said dynamic peak threshold value is met.

2. The system as claimed in claim 1 further comprising a code being assigned to the first and second peak indicators and the master lock indicator.

3. The system as claimed in claim 1 wherein the system is a handheld portable device.

4. The system as claimed in claim 1 wherein the first and second peak indicators and the master lock indicator are visual indicators.

5. The system as claimed in claim 1 wherein the first and second peak indicators and the master lock indicator are audible indicators.

6. The system as claimed in claim 1 wherein the sample signals are a measure of signal quality.

7. The system as claimed in claim 6 further comprising a code being assigned to the first and second peak indicators and the master lock indicator.

8. The system as claimed in claim 1 wherein the system is an analog system.

9. The system as claimed in claim 8 wherein the system further comprises applying hysteresis to the first and second peak indicators for stabilizing the first and second peak indicators when they are on the verge of the first and second threshold values respectively.

10. The system as claimed in claim 1 wherein the system is a digital system.

11. An analog method for positioning a dish antenna having a plurality of low noise block converters (LNB's) for the simultaneous reception of signals from a plurality of satellites in a direct broadcast satellite system comprising the steps of:

powering at least a first LNB and a second LNB in an alternating fashion;

taking a sample signals from the first LNB when it is powered;

taking a sample signals from the second LNB when it is powered;

comparing the sample signals from the first LNB to determine a first threshold;

comparing the sample signals from the second LNB to determine a second threshold;

determining a first peak signal has been detected when the sample signal from the first LNB meets the first threshold;

indicating a first peak signal has been detected;

determining a second peak signal detected when the sample signal from the second LNB meets the second threshold;

measuring an instantaneous signal value of the first LNB when the second peak signal has been detected;

determining a dynamic master threshold by subtracting the instantaneous signal value of the first LNB from the first threshold and dividing by two and adding the measured instantaneous signal value of the first LNB;

indicating a master lock when the dynamic master threshold has been met when the sample signal from the first LNB is equal to the dynamic master threshold.

12. The method as claimed in claim 10 further comprising the step of filtering the sample signals to isolate the portion of interest.

13. The method as claimed in claim 12 further comprising the step of amplifying the filtered sample signals.

14. The method as claimed in claim 11 further comprising the step of applying hysteresis to the sample signals when they are within a predetermined range of the first and second thresholds.

15. A digital method for positioning a dish antenna having a plurality of low noise block converters (LNB's) for the simultaneous reception of signals from a plurality of satellites in a direct broadcast satellite system comprising the steps of:

powering at least a first LNB and a second LNB in an alternating fashion;

taking sample signals from the first LNB when it is powered while moving the dish antenna;

taking sample signals from the second LNB when it is powered while moving the dish antenna;

comparing the sample signals from the first LNB to determine a first threshold value;

determining a first peak signal has been detected when a sample signal from the first LNB meets the first threshold value;

assigning a DiSEqC code to the first peak signal;

indicating a first peak signal has been detected;

comparing sample signals from the second LNB to determine a second threshold value;

determining a second peak signal has been detected when a sample signal from the second LNB meets the second threshold value;

assigning a code to the second peak signal;

measuring an instantaneous value of a signal from the first LNB upon determination of a second peak signal;

calculating a dynamic master threshold;

monitoring the signals from the first LNB while moving the antenna until the sample signal from the first LNB meets the dynamic master threshold; and indicating a master lock when the master threshold has been met.

16. The method as claimed in claim 15 further comprising the step of filtering the sample signals to isolate the portion of interest.

17. The method as claimed in claim 16 further comprising the step of amplifying filtered sample signals.

18. The method as claimed in claim 15 wherein the step of calculating a master threshold further comprises the steps of:

subtracting the measured instantaneous signal value of the first LNB from the first threshold, dividing by two, and adding back the measured instantaneous signal value of the first LNB.

* * * * *